United States Patent
Ur et al.

(10) Patent No.: US 10,986,116 B1
(45) Date of Patent: Apr. 20, 2021

(54) SYSTEM AND METHOD FOR ANALYZING AND CORRECTING AN ANOMALY IN SPLIT COMPUTER NETWORKS

(71) Applicant: Source Ltd., Valletta (MT)

(72) Inventors: Shmuel Ur, Shorashim (IL); Sapir Rubin, Ramat Gan (IL)

(73) Assignee: SOURCE LTD., Valletta (MT)

( * ) Notice: Subject to any disclaimer, the term of this patent is extended or adjusted under 35 U.S.C. 154(b) by 0 days.

(21) Appl. No.: 16/930,566

(22) Filed: Jul. 16, 2020

(51) Int. Cl.
| G08B 23/00 | (2006.01) |
| G06F 12/16 | (2006.01) |
| G06F 12/14 | (2006.01) |
| G06F 11/00 | (2006.01) |
| H04L 29/06 | (2006.01) |
| H04L 12/26 | (2006.01) |
| H04L 12/24 | (2006.01) |

(52) U.S. Cl.
CPC ...... H04L 63/1425 (2013.01); H04L 41/0677 (2013.01); H04L 43/10 (2013.01); H04L 43/12 (2013.01)

(58) Field of Classification Search
CPC . H04L 63/1425; H04L 41/0677; H04L 43/10; H04L 43/12
USPC .......................................................... 726/22
See application file for complete search history.

(56) References Cited

U.S. PATENT DOCUMENTS

| 7,181,769 B1 * | 2/2007 | Keanini ............... H04L 63/1416 713/166 |
| 7,926,113 B1 * | 4/2011 | Gula ................... H04L 63/1425 726/25 |
| 2005/0044406 A1 * | 2/2005 | Stute ................. C12Q 2525/143 726/4 |
| 2005/0177872 A1 * | 8/2005 | Boulanger .......... H04L 63/1441 726/22 |
| 2009/0161554 A1 * | 6/2009 | Agarwal ............. H04L 43/0852 370/241 |
| 2009/0293122 A1 * | 11/2009 | Abdel-Aziz ........ H04L 63/1416 726/23 |
| 2019/0342157 A1 * | 11/2019 | Tang ................... H04L 67/1097 |

OTHER PUBLICATIONS

Nour Moustafa; Novel Geometric Area Analysis Technique for Anomaly Detection Using Trapezoidal Area Estimation on Large-Scale Networks; IEEE:2017; pp. 481-494.*

* cited by examiner

*Primary Examiner* — Monjur Rahim
(74) *Attorney, Agent, or Firm* — Pearl Cohen Zedek Latzer Baratz LLP

(57) ABSTRACT

A system and method of correcting an anomaly in a split computer network, where the split computer network includes a first subnet, connecting one or more requestor nodes to a first intermediary node, and a second subnet, connecting the first intermediary node to one or more approver nodes may include performing, by at least one processor associated with the first intermediary node: monitoring transactions between the one or more requestor nodes and the one or more approver nodes, via the first intermediary node; analyzing the monitored transactions, to obtain a transaction pattern; probing communication between an examined requestor node and at least one approver node; analyzing the probed communication, in view of the transaction pattern, to identify a suspected transaction anomaly; and producing a suggestion of at least one corrective action, based on the suspected transaction anomaly.

20 Claims, 7 Drawing Sheets

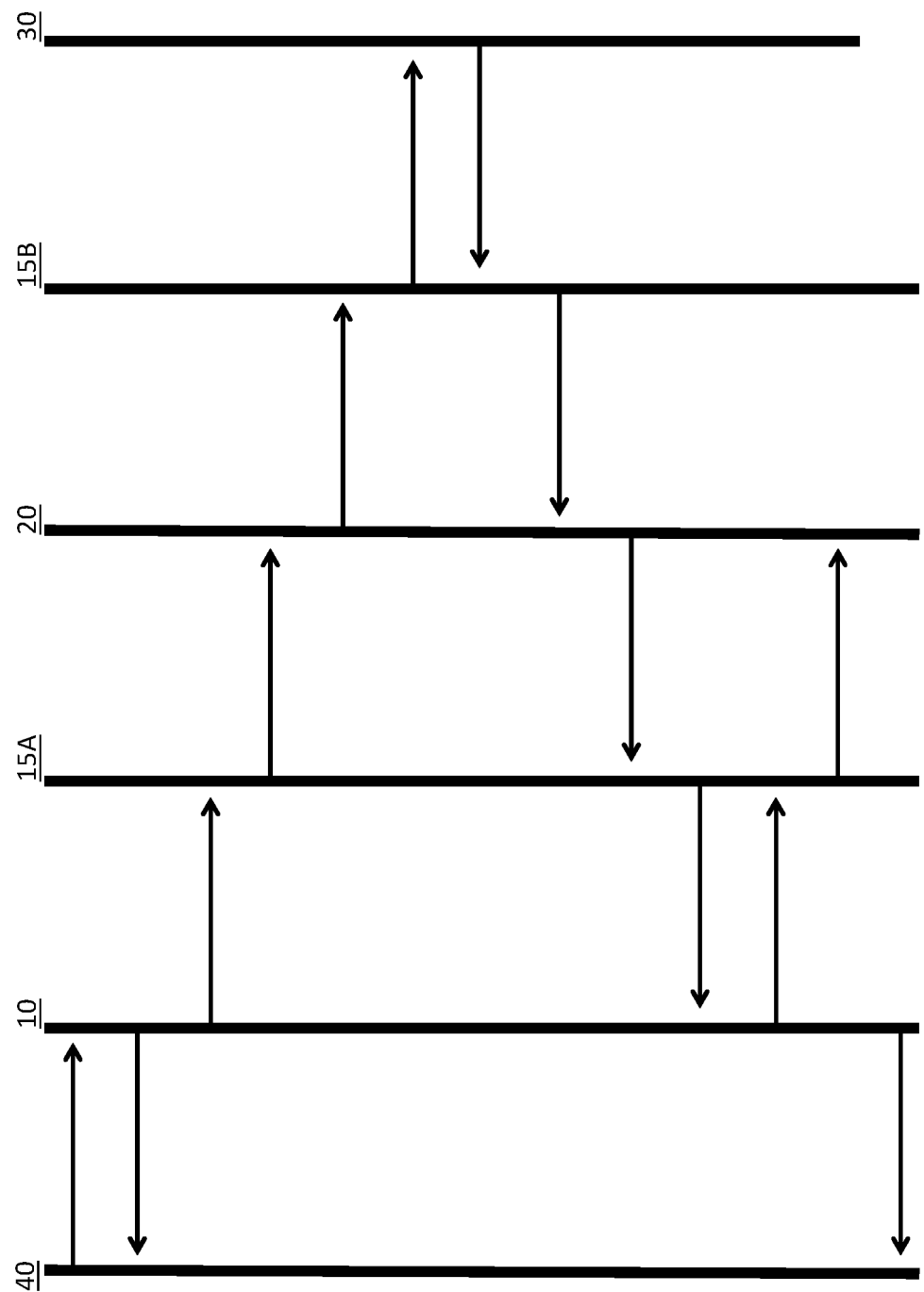

SYSTEM AND METHOD FOR ANALYZING AND CORRECTING AN ANOMALY IN SPLIT COMPUTER NETWORKS

FIELD OF THE INVENTION

The present invention relates generally to configuration of computer networks. More specifically, the present invention relates to analyzing and correcting an anomaly in split computer networks.

BACKGROUND OF THE INVENTION

Systems and methods for analyzing traffic over computer networks, such as the Internet, are ubiquitous. These may include an abundance of network modules, implemented in hardware and/or software, adapted to monitor or probe communication that traverse the network, analyze the probed data, and apply any one of a plurality of networking protocols to improve or fix a condition of the network. These protocols may include for example, routing protocols which may be designed to redirect messages to overcome local network failures or balance a network's load.

SUMMARY OF THE INVENTION

Currently available methods and systems may not be uniquely adapted to efficiently analyze communication that is traversed over split computer networks having a specific configuration, as elaborated herein.

In other words, currently available methods and systems (e.g., gateways, bridges, routers and the like) for managing communication of messages via a network may accumulate information relating to traversal of messages via the network in which they reside and manage said communication (e.g., route messages via the network) according to the accumulated information. However, currently available systems may not be able to analyze a condition of (e.g., detect an anomaly in) one or more nodes, based on transactions that were not communicated via their network (e.g., via other networks, for which they are denied access).

Moreover, currently available methods and systems for managing communication of messages via a network may not be adapted to utilize knowledge of specific message payloads that are communicated over the network, so as to identify specific transaction anomalies.

Embodiments of the present invention may include a method of correcting an anomaly in a split computer network.

The split computer network may include a first subnet, connecting one or more requestor nodes to a first intermediary node, and a second subnet, connecting the first intermediary node to one or more approver nodes. The split network may further include one or more second intermediary nodes that may be communicatively connected via the first subnet to at least one requestor node, communicatively connected via the second subnet to at least one approver node, and logically disconnected from the first intermediary node, as elaborated herein.

Embodiments of the invention may include performing, by at least one processor associated with, or included in the first intermediary node: monitoring of transactions between the one or more requestor nodes and the one or more approver nodes, via the first intermediary node; analyzing the monitored transactions, to obtain a transaction pattern; probing communication between an examined requestor node and at least one approver node; analyzing the probed communication, in view of the transaction pattern, to identify a suspected transaction anomaly; and producing a suggestion of at least one corrective action, based on the suspected transaction anomaly.

According to some embodiments of the invention, monitoring the transactions may include at least one of: receiving a request message from a monitored requestor node; extracting at least one data element from the request message; and directing the request message to a relevant approver node.

Additionally, or alternatively, monitoring the transactions may further include at least one of: receiving an acknowledgement message from the relevant approver node; extracting at least one data element from the acknowledgement message; and directing the acknowledgement message to the monitored requestor node.

According to some embodiments of the invention, the transaction pattern may include at least one data element, including for example: an identification of an examined requestor node, a category of the examined requestor node, a message payload, a category of a message payload, an identification of an approver node, a frequency of messages between the examined requestor node and one or more approver nodes, and a timing of messages between the examined requestor node and one or more approver nodes.

According to some embodiments of the invention, the at least one processor of the first intermediary node may be further configured to: produce an expected message template, based on the transaction pattern; and identify a suspected transaction anomaly as a condition in which the probed communication lacks a message that corresponds to the template of the expected message.

According to some embodiments of the invention, the template may be of an expected request message, and the at least one processor of the first intermediary node may be further configured to prompt the examined requestor node, to initiate a request message corresponding to the template.

According to some embodiments of the invention, the at least one processor of the first intermediary node may be further configured to identify a suspected transaction anomaly by: receiving, by the first intermediary node, the prompted request message; extracting at least one data element from the prompted transaction request payload; and identifying a discrepancy between the extracted data element and the transaction pattern.

Additionally, or alternatively, the at least one processor of the first intermediary node may be further configured to identify a suspected transaction anomaly by determining that a prompted request message has not been received from the examined requestor node within a predefined time period.

According to some embodiments of the invention, the at least one processor of the first intermediary node may be further configured to produce at least one indication of a suspected transaction anomaly. The indication of suspected transaction anomaly may include, for example, an indication that the number or frequency of transactions between the examined requestor node and one or more approver nodes short of a number expected by the one or more transaction patterns; an indication that communication between the examined requestor node and one or more approver nodes does not fit the message template; an indication that a configuration of the examined requestor node dictates preference of communication via a second intermediary node; an indication that a configuration of the examined requestor node produces unexpected message payload; an indication that a computing device pertaining to the examined requestor node has failed; an indication that a webpage pertaining to the examined requestor node has failed; an indication of one or more nodes that may be suspected of having poor connectivity performance; an indication that a portion of communicated transactions that have failed; and an indication of one or more properties of transactions that may be associated with a high rate of transaction failure.

According to some embodiments of the invention, the suggestion of at least one corrective action may be or may include, for example, sending a message to an account of a contact person, associated with the examined requestor node, to notify them of a failure of the examined requestor node; sending a command to a routing module so as to route messages between the examined requestor node and one or more approver nodes via functional nodes of the split computer network; notifying one or more users of requestor nodes, intermediary nodes and/or approver nodes regarding a computer network connectivity problem; routing one or more specific transactions from the examined requestor node to at least one specific approver node; and sending a suggestion to the examined requestor node to negotiate with an initiator node so as to change one or more elements of metadata and/or payload data of a transaction.

Embodiments of the present invention may include a method of actively probing a node in a computer network by at least one processor. Embodiments of the method may include: monitoring transaction messages between a first node and a second node in the computer system; clustering said monitoring transaction messages to produce one or more transaction patterns; based on said one or more transaction patterns, identifying a condition in which a transaction message may be missing, in a sense that it has unexpectedly not been sent from the first node to the second node; and sending a prompt message to the first node so as to prompt the first node to send at least one message corresponding to the missing transaction message.

Embodiments of the present invention may include a system for correcting an anomaly in a split computer network. Embodiments of the system may include a first intermediary node, communicatively connected via a first subnet to one or more requestor nodes and communicatively connected via a second subnet to one or more approver nodes. The first intermediary node may include a non-transitory memory device, wherein modules of instruction code may be stored, and at least one processor associated with the memory device, and configured to execute the modules of instruction code. Upon execution of said modules of instruction code, the at least one processor may be configured to: monitor transactions between the one or more requestor nodes and the one or more approver nodes, via the first intermediary node; analyze the monitored transactions, to obtain a transaction pattern; probe communication between an examined requestor node and at least one approver node; analyze the probed communication, in view of the transaction pattern, to identify a suspected transaction anomaly; and produce a suggestion of at least one corrective action, based on the suspected transaction anomaly.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIG. 3 is a message flow diagram, depicting an example of a transaction that may be traversed over a split computer network, according to some embodiments of the present invention;

Figure 1:
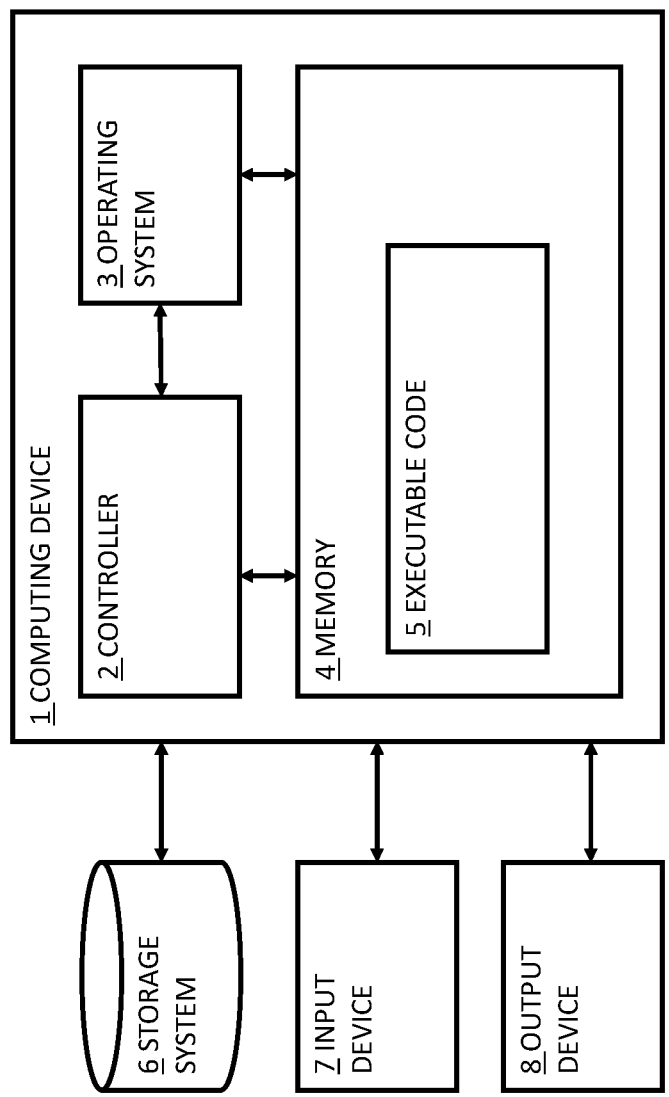
FIG. 1 is a block diagram, depicting a computing device which may be included in a system for analyzing and correcting an anomaly in split computer networks, according to some embodiments of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE PRESENT INVENTION

One skilled in the art will realize the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention. Some features or elements described with respect to one embodiment may be combined with features or elements described with respect to other embodiments. For the sake of clarity, discussion of same or similar features or elements may not be repeated.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that may store instructions to perform operations and/or processes.

Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. The term set when used herein may include one or more items. Unless explicitly stated, the method embodiments described herein are not constrained to a particular order or sequence. Additionally, some of the described method embodiments or elements thereof can occur or be performed simultaneously, at the same point in time, or concurrently.

The term set when used herein can include one or more items. Unless explicitly stated, the method embodiments described herein are not constrained to a particular order or sequence. Additionally, some of the described method embodiments or elements thereof can occur or be performed simultaneously, at the same point in time, or concurrently.

Reference is now made to FIG. 1, which is a block diagram depicting a computing device, which may be included within an embodiment of a system for analyzing and/or correcting an anomaly in a split computer network, according to some embodiments.

Computing device 1 may include a processor or controller 2 that may be, for example, a central processing unit (CPU) processor, a chip or any suitable computing or computational device, an operating system 3, a memory 4, executable code 5, a storage system 6, input devices 7 and output devices 8. Processor 2 (or one or more controllers or processors, possibly across multiple units or devices) may be configured to carry out methods described herein, and/or to execute or act as the various modules, units, etc. More than one computing device 1 may be included in, and one or more computing devices 1 may act as the components of, a system according to embodiments of the invention.

Operating system 3 may be or may include any code segment (e.g., one similar to executable code 5 described herein) designed and/or configured to perform tasks involving coordination, scheduling, arbitration, supervising, controlling or otherwise managing operation of Computing device 1, for example, scheduling execution of software programs or tasks or enabling software programs or other modules or units to communicate. Operating system 3 may be a commercial operating system. It will be noted that an operating system 3 may be an optional component, e.g., in some embodiments, a system may include a computing device that does not require or include an operating system 3.

Memory 4 may be or may include, for example, a Random Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short term memory unit, a long term memory unit, or other suitable memory units or storage units. Memory 4 may be or may include a plurality of, possibly different memory units. Memory 4 may be a computer or processor non-transitory readable medium, or a computer non-transitory storage medium, e.g., a RAM. In one embodiment, a non-transitory storage medium such as memory 4, a hard disk drive, another storage device, etc. may store instructions or code which when executed by a processor may cause the processor to carry out methods as described herein.

Executable code 5 may be any executable code, e.g., an application, a program, a process, task or script. Executable code 5 may be executed by processor or controller 2 possibly under control of operating system 3. For example, executable code 5 may be an application that may analyze and/or correct an anomaly in a split computer network, as further described herein. Although, for the sake of clarity, a single item of executable code 5 is shown in FIG. 1, a system according to some embodiments of the invention may include a plurality of executable code segments similar to executable code 5 that may be loaded into memory 4 and cause processor 2 to carry out methods described herein.

Storage system 6 may be or may include, for example, a flash memory as known in the art, a memory that is internal to, or embedded in, a micro controller or chip as known in the art, a hard disk drive, a CD-Recordable (CD-R) drive, a Blu-ray disk (BD), a universal serial bus (USB) device or other suitable removable and/or fixed storage unit. Data describing, or corresponding to communication of messages over a split computer network may be stored in storage system 6 and may be loaded from storage system 6 into memory 4 where it may be processed by processor or controller 2. In some embodiments, some of the components shown in FIG. 1 may be omitted. For example, memory 4 may be a non-volatile memory having the storage capacity of storage system 6. Accordingly, although shown as a separate component, storage system 6 may be embedded or included in memory 4.

Input devices 7 may be or may include any suitable input devices, components or systems, e.g., a detachable keyboard or keypad, a mouse and the like. Output devices 8 may include one or more (possibly detachable) displays or monitors, speakers and/or any other suitable output devices. Any applicable input/output (I/O) devices may be connected to Computing device 1 as shown by blocks 7 and 8. For example, a wired or wireless network interface card (NIC), a universal serial bus (USB) device or external hard drive may be included in input devices 7 and/or output devices 8. It will be recognized that any suitable number of input devices 7 and output device 8 may be operatively connected to Computing device 1 as shown by blocks 7 and 8.

A system according to some embodiments of the invention may include components such as, but not limited to, a plurality of central processing units (CPU) or any other suitable multi-purpose or specific processors or controllers (e g, similar to element 2), a plurality of input units, a plurality of output units, a plurality of memory units, and a plurality of storage units.

The following Table 1 includes a list of terms used throughout this document, alongside respective explanation of the terms, for the reader's convenience:

TABLE 1

| | |
|---|---|
| Node | The term 'Node' may be used herein to refer to a computerized system (e.g., element 1 of FIG. 1), used for processing and/or routing messages within a network of nodes. Nodes may include, for example: an individual computer, a server in an organization and a site operated by an organization (e.g. a data center or a server farm operated by an organization). For example, in Monetary Exchange (ME) transactions, nodes may include a server in a banking system, a computer of a paying-card issuer, etc. |

TABLE 1-continued

| | |
|---|---|
| Message, Data message | The terms 'Message' and "Data message" may be used herein interchangeably, to refer to a single transmission or communication of data from a source node to a destination node of a computer network. |
| Transaction | The term 'Transaction' may be used herein to refer to communication of data between nodes of a computer network. According to some embodiments, a transaction may include a single, one-way transfer of a data message between a source node and a destination node. For example: a first node may propagate at least one data file to a second node, as a payload within a message. Alternatively, transactions may include a plurality of related messages, transferred between a source node and a destination node. For example, a transaction may include data representing monetary exchange between two institutions (such as banks), operating computer servers and computer equipment, where in order to carry out the transaction data needs to be transferred between the servers (e.g., in both ways) and other computer equipment operated by the institutions. |
| Communication | The term 'Communication' may be used herein to refer to an overall transmission (or lack thereof) of messages in a computer network. |
| Requestor node (Requestor) | The term "Requestor node" or "Requestor" may be used herein to refer to a node of a computer network, that may be configured to initiate a transaction with an approver node, e.g., by sending a transaction request message. |
| Transaction request | The term "Transaction request" may be used herein to refer to a request placed by a requestor node (or a user thereof), for a transaction between the requestor node and a destination node of a computer network. |
| Approver node (Approver) | The term "Approver node" or "Approver" may be used herein to refer to a node of a computer network, that may be configured to respond to a transaction initiated by a requestor node. For example, in a monetary exchange transaction, a requestor node may be a computing device associated with a merchant, and an approver node may be a computing device associated with an acquirer's server (e.g., a banking server). The requestor node may initiate a request to perform a monetary exchange transaction based on properties of a paying card (e.g., a credit card number) that has been presented during purchase of goods, and the approver node may be configured to respond to the transaction request, e.g., by approving or rejecting the request. |
| Intermediary node | The term "Intermediary node" may be used herein to refer to a node of a computer network, that may be configured to mediate and/or route communication between one or more requestor nodes of a computer network and one or more approver nodes of the computer network, as elaborated herein. |
| Split network | The term "Split network" may be used herein to refer to a network configuration in which transactions between the one or more requestor nodes and the one or more approver nodes are routed only via intermediary nodes. The network may be regarded as split in a sense that it may include a first portion of the network (e.g., a first sub-network) that may connect the one or more requestors to an intermediary node, and a second portion of the network (e.g., a second sub-network) that may connect the intermediary node to one or more approver nodes. In such configurations, embodiments of the invention may be configured to analyze, by an intermediary node, communication between requestor nodes and approver nodes, and suggest one or more corrective actions, as elaborated herein. |
| Payload | The term 'Payload' may be used herein to refer to at least one content of a message that may be sent from a source node (e.g., a requestor node) to a destination node (e.g., an approver node). Payloads may include, for example: information included within the message (e.g. parameters of a financial transaction, such as a sum and a currency of a monetary exchange), a data file sent over the transaction, etc. |
| Neural Network | The term "Neural Network" (NN), e.g., a NN implementing machine learning (ML), may refer to an information processing paradigm that may include nodes, referred to as neurons, organized into layers, with links between the neurons. The links may transfer signals between neurons and may be associated with weights. A NN may be configured or trained for a specific task, e.g., pattern recognition or classification. Training a NN for the specific task may involve adjusting these weights based on examples. Each neuron of an intermediate or last layer may receive an input signal, e.g., a weighted sum of output signals from other neurons, and may process the input signal using a linear or nonlinear function (e.g., an activation function). The results of the input and intermediate layers may be transferred to other neurons and the results of the output layer may be provided as the output of the NN. Typically, the neurons and links within a NN are represented by mathematical constructs, such as activation functions and matrices of data elements and weights. A processor, e.g. CPUs or graphics processing units (GPUs), or a dedicated hardware device may perform the relevant calculations. |

Figure 2:
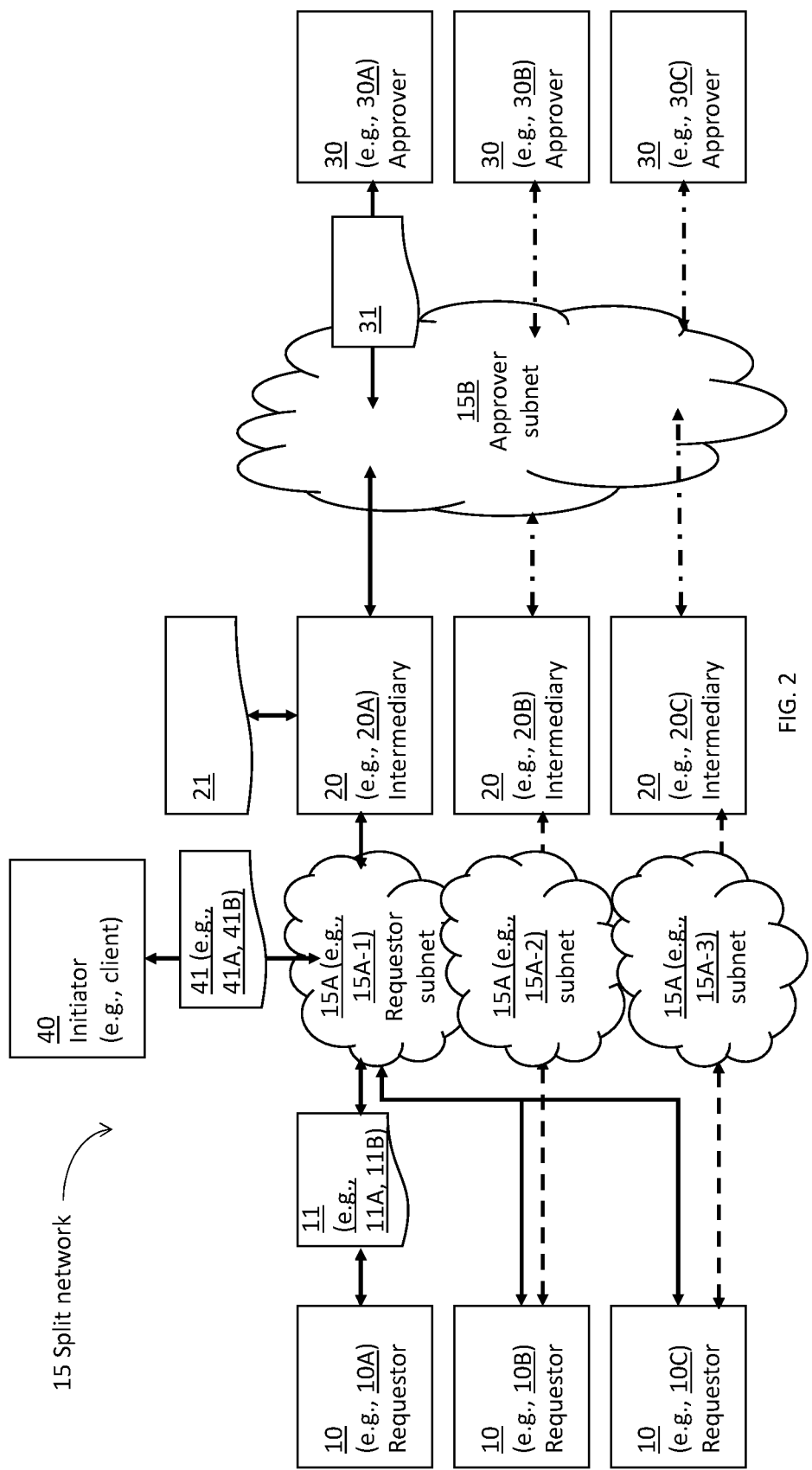
FIG. 2 is a block diagram, depicting a split computer network, that may be analyzed and/or applied a corrective action by embodiments of the present invention.

Reference is now made to FIG. 2 which is a block diagram, depicting a split computer network 15, that may analyze and/or apply a corrective action by embodiments of the present invention. As shown in FIG. 2, split computer network 15 may include a first subnet (marked "requestor network" 15A), connecting one or more requestor nodes 10 (e.g., element 10A) to an intermediary node 20 (e.g., element 20A), and a second subnet (marked "approver network" 15B), connecting the intermediary node 20 (e.g., element 20A) to one or more approver nodes 30 (e.g., element 30A).

According to some embodiments, transactions may be initiated by a requestor node 10, for example by sending or emitting a transaction request message 11A, addressed to a specific approver node.

Additionally, or alternatively, requestor node 10 may be prompted by a third party computing device (e.g., initiator 40) to emit transaction request message 11A so as to initiate the transaction. For example, requestor node 10 may be a computing device associated with a merchant, initiator 40 may be a computing device associated with a client (e.g., a purchasing client), and approver node 30 may be an acquirer server or a banking server, handling the merchant's bank account. In this condition, initiator 40 may prompt (e.g., element 41A) requestor 10A by presenting or transmitting to requestor 10A the credentials of a paying card (e.g., a credit card number). Requestor node 10 may subsequently emit transaction request message 11A, directed or addressed to approver node 30, to initiate a transaction. In this example, the transaction may include transaction request 11A, a communication of approver node 30 with one or more additional computing devices, such as a server associated with an issuer of the paying card (e.g., so as to process the payment) and an acknowledgement message (e.g., element 31), addressed back to requestor (e.g., so as to finalize the transaction).

As elaborated herein, embodiments of the invention may allow at least one processor (e.g., element 2 of FIG. 1) that may be included in, or associated with an intermediary node 20 (e.g., element 20A) to monitor the communication of transactions between the one or more requestor nodes 10 and the one or more approver nodes 30, via the intermediary node 20 (e.g., 20A). Embodiments may subsequently identify a suspected transaction anomaly, and produce a suggestion 21 of at least one corrective action, based on the suspected transaction anomaly, as elaborated herein.

According to some embodiments, and as depicted in FIG. 2, split network 15 may include a first intermediary node 20 (e.g., element 20A), which may be a computing device (e.g., element 1 of FIG. 1) and may be adapted to implements one or more methods of analyzing and correcting an anomaly in split computer networks 15, as elaborated herein. Additionally split network 15 may further include one or more second intermediary nodes 20 (e.g., elements 20B, 20C) from which first intermediary node 20A may be logically disconnected.

The term "logically disconnected" may be used in this context to indicate that first intermediary node 20A may not communicate with the one or more second intermediary nodes 20 (e.g., elements 20B, 20C) so as to obtain information pertaining to transactions that have been communicated over split network 15.

Pertaining to the example above, in which requestor node 10A may be a computing device associated with a merchant, and approver node 30A may be an acquirer server or a banking server, handling the merchant's bank account: First intermediary nodes 20A and second intermediary nodes 20B may pertain to competing legal entities. In this condition, both nodes 20A and 20B may transfer transactions between requestor node 10A and approver node 30A, and may even communicate at some level therebetween (e.g., by sending 'ping' messages to their corresponding internet protocol (IP) addresses), but may be logically disconnected in a sense that they may not communicate information pertaining to transactions (e.g., monetary transactions) that are communicated via split network 15.

In other words: the one or more second intermediary nodes (20B, 20C) may be communicatively connected via the first subnet 15A to at least one requestor node 10, communicatively connected via the second subnet 15B to at least one approver node 30, and logically disconnected from the first intermediary node 20A. Embodiments of the invention may enable first intermediary node 20A to implement methods of identifying an anomaly in one or more transactions, and suggest an appropriate corrective measure as elaborated herein, even if one or more (e.g., all) messages pertaining to the one or more transactions are routed via the one or more second intermediary nodes (20B, 20C), and not via first intermediary node 20A.

Reference is now made to FIG. 3 which is a message flow diagram, depicting an example of a transaction 100 that may be traversed over split computer network (e.g., element 15 of FIG. 2), according to some embodiments.

As shown in step S100, initiator 40 may prompt (e.g., element 41A of FIG. 2) a requestor node 10 to emit a transaction request message (e.g., element 11A of FIG. 2), directed to an appropriate approver node 30; for example initiator 40 may send a prompt to a node 30. Requestor node 10 may respond with an acknowledgement message S100', indicating reception of S100. According to some embodiments, and as explained above (e.g., in the example of a client purchasing goods from a merchant), initiator 40 may be a third-party computing device. Alternatively, initiator 40 may be implemented as the same element (e.g., the same computing device 1 of FIG. 1) as intermediary node 20. In this configuration, intermediary node 20 may prompt requestor node 10 to emit transaction request message 11A, and may analyze the subsequent transaction 100, to identify suspected anomalies, as elaborated herein.

As shown in step S105, requestor node 10 may emit transaction request message 11A, directed or addressed to an approver node 30. According to some embodiments, requestor node 10 may emit transaction request message 11A in response to a prompt message 41A by initiator node 40 (e.g., as elaborated in relation to step S100). Alternatively, requestor node 10 may emit transaction request message 11A independent of any such prompt message 41A (e.g., as a scheduled event).

As shown in steps S110, S115 and S120, transaction request message 11A may be propagated via one or more nodes of requestor subnet 15A to an intermediary node 20 (e.g., element 20A of FIG. 2). Intermediary node 20 may in turn direct or route transaction request message 11A to the appropriate addressee, approver node 30.

Approver node 30 may process the requested transaction (e.g., of transaction request message 11A) and, as shown in step S125, produce an acknowledgement message (e.g., element 31 of FIG. 2). Pertaining to the example of a payment by credit card, acknowledgement message 31 may include a notification that a payment has been successfully processed by a third-party issuer server, associated with the purchaser's credit card.

As shown in step S130, acknowledgement message 31 may be propagated via one or more nodes of approver subnet 15B back to intermediary node 20.

As shown in steps S135 and 140, intermediary node 20 may direct or route acknowledgement message 31, via one or more nodes of requestor subnet 15A back to the appropriate addressee, requestor node 10.

As shown in steps S145 and S150, requestor node 10 may send a message such as a confirmation message (e.g., element 11B of FIG. 2), so as to confirm reception of acknowledgement message 31, via one or more nodes of requestor subnet 15A to intermediary node 20. Additionally, or alternatively, as shown in step S155, requestor node 10 may send a notification message 41B to initiator 40, so as to notify the termination (e.g., successful or non-successful termination) of transaction 100.

As elaborated herein, intermediary node 20 may be configured to analyze one or more stages of transaction 100, to identify a suspected anomaly in the communication of transactions over network 15, and may perform at least one corrective action, or produce at least one suggestion (element 21 of FIG. 2) of a corrective action, based on the suspected anomaly, as elaborated herein.

Figure 4A:
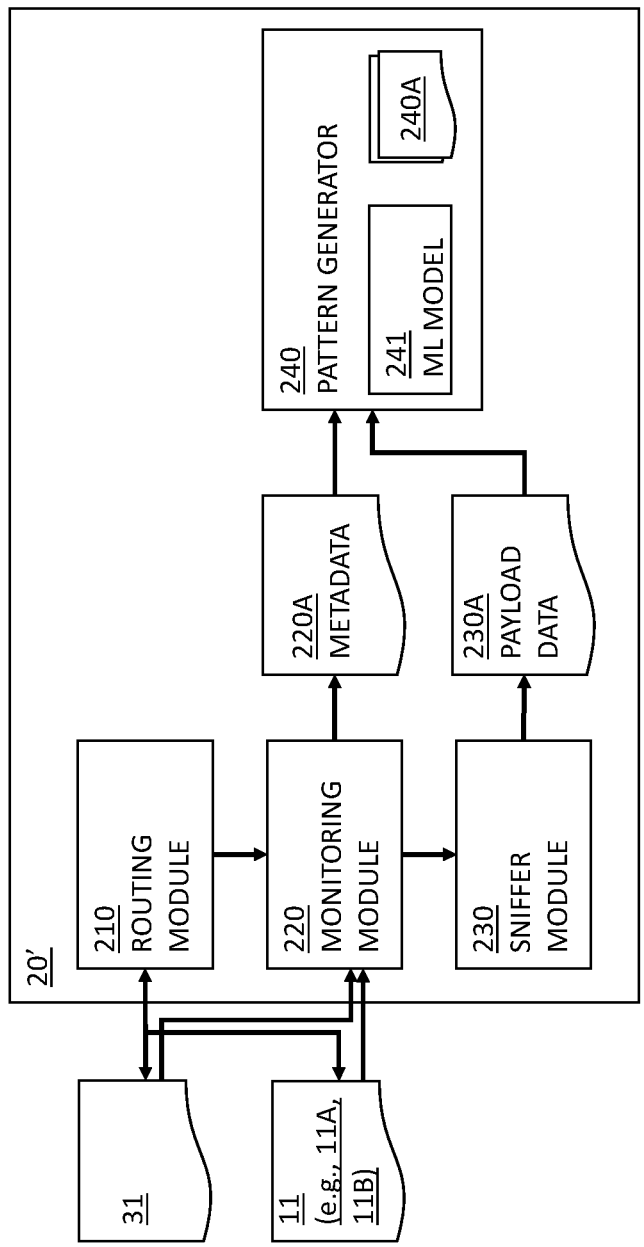
FIG. 4A is a block diagram, depicting an example of a system for analyzing and/or correcting an anomaly in a split computer network, during a training stage, according to some embodiments of the present invention.
Figure 4B:
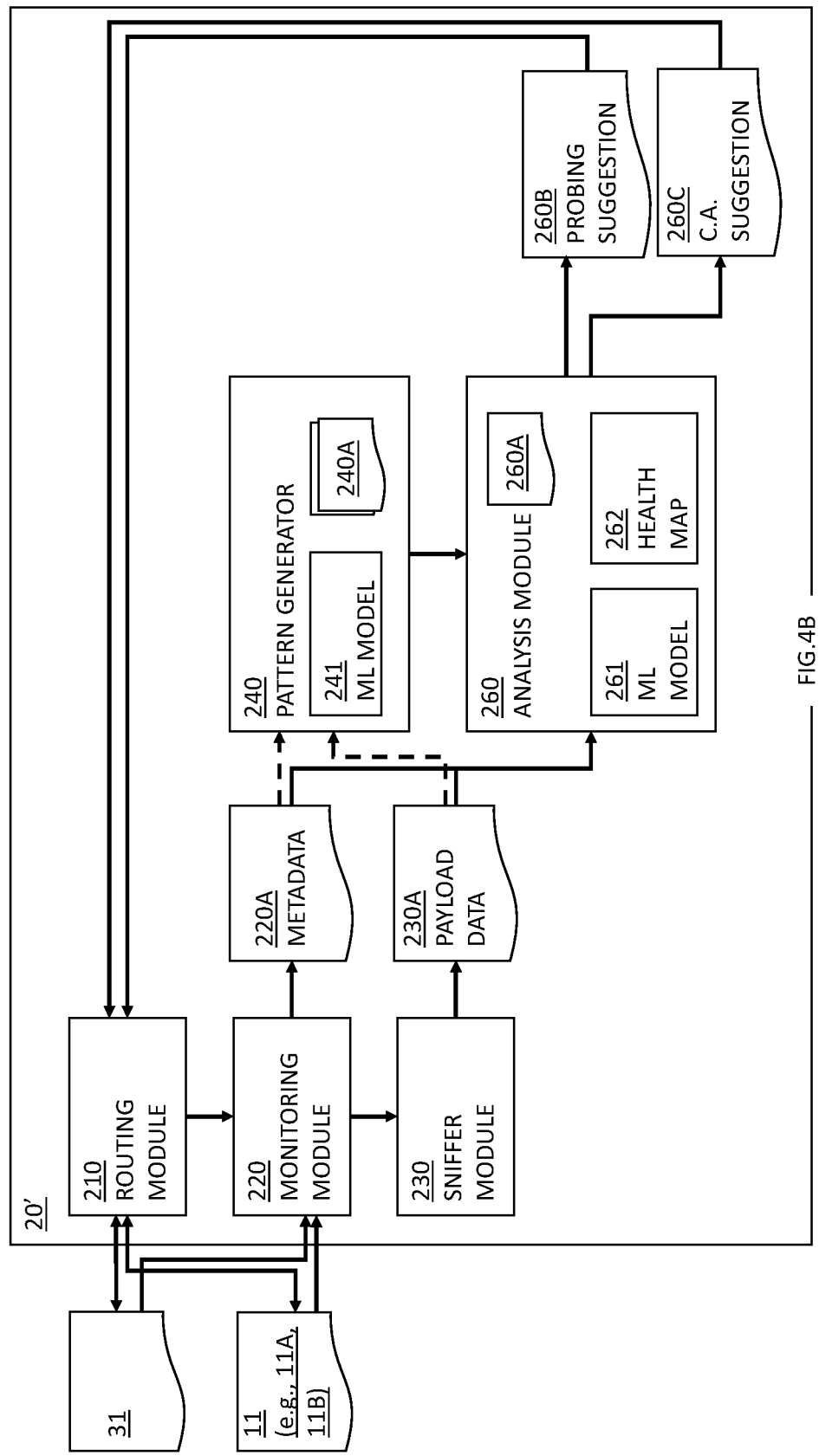
FIG. 4B is a block diagram, depicting an example of a system for analyzing and/or correcting an anomaly in a split computer network, during an inference stage, according to some embodiments of the present invention.

Reference is now made to FIG. 4A, which is a block diagram depicting an example of a system for analyzing and/or correcting an anomaly in a split computer network 15, during a training stage, according to some embodiments of the present invention. Reference is also made to FIG. 4B which is a block diagram, depicting an example of a system for analyzing and/or correcting an anomaly in a split computer network, during an inference stage, according to some embodiments of the present invention.

According to some embodiments of the invention, system 20' may be implemented on, or installed on the same computing device as intermediary node 20. In other words, in such embodiments, system 20' may be the same as intermediary node 20, and may be adapted to perform the functions of intermediary node 20. Alternatively, in a condition that split network 15 includes a plurality of intermediary nodes 20, system 20' may be installed on one or more (e.g., not all) intermediary nodes 20 of split network 15. Accordingly, the terms system 20' and intermediary node 20 may be used interchangeably, according to context.

According to some embodiments of the invention, split network 15 may include a plurality of intermediary nodes, communicatively connected via subnet 15A to at least one requestor node, and communicatively connected via subnet 15B to at least one approver node. In such embodiments, one or more intermediary nodes 20 may each have or include their own system 20'. In such implementations, the one or more intermediary nodes 20 may be logically disconnected in relation to transactions 100 traversed over network 15 as elaborated herein (e.g., in relation to FIG. 2). In other words, the one or more intermediary nodes 20 may not share information included in, or pertaining to messages of transactions 100 that have traversed network 15. For example, the one or more intermediary nodes 20 may each pertain to separate, possibly competing entities such as competing financial institutes. Embodiments of the invention may provide an improvement over currently available systems for routing of data, by allowing a first intermediary node 20 (that includes an installation of system 20'), to determine whether an expected transaction 100 (or a message included therein) has been routed via another intermediary node 20, from which the first intermediary node 20 may not acquire transaction-related data.

According to some embodiments of the invention, system 20' may be implemented as a software module, a hardware module or any combination thereof. For example, system 20' may be or may include a computing device such as element 1 of FIG. 1, and may be adapted to execute one or more modules of executable code (e.g., element 5 of FIG. 1) to analyze and/or correct an anomaly in a split computer network, as further described herein.

Additionally, or alternatively, system 20' may be implemented by a plurality of computing devices such as element 1 of FIG. 1. For example, intermediary node 20 may be communicatively connected (e.g., via the Internet) to one or more additional computing devices (e.g., computers that may provide online computing services), that may implement one or more functions or modules of system 20', as elaborated herein.

According to some embodiments of the invention, system 20' may include a monitoring module 220 and a sniffer module 230, adapted to monitor transactions (e.g., element 100 of FIG. 3) between one or more requestor nodes (e.g., element 10 of FIG. 2) and one or more approver nodes (e.g., element 30 of FIG. 2), via the intermediary node 20 (e.g., via system 20').

For example, monitored transactions 100 may include one or more messages (e.g., 11A, 11B, 31) traversed over split network 15 between requestor nodes 10 and approver nodes 30. Monitoring module 220 may be adapted to obtain or extract one or more data elements, including metadata (marked as metadata element 220A) pertinent to the messages of transaction 100. Sniffer module 220 may be adapted to obtain or extract data, including payload data (marked as payload data element 230A) pertinent to messages of transaction 100.

According to some embodiments of the invention, system 20' may include a routing module 210, adapted to route one or more messages of transaction 100. Routing module 210 may use any type of routing protocol to facilitate or cause routing of one or more messages of transaction 100 through split network 15, as known in the art. Said routing protocols may include, for example, the Interior Gateway Routing Protocol (IGRP), the Enhanced Interior Gateway Routing Protocol (EIGRP), the Routing Information Protocol (RIP), the Border Gateway Protocol (BGP) and the Exterior Gateway Protocol (EGP).

For example, system 20' may be configured to monitor transactions 100 by receiving a request message 11A from a monitored requestor node 10; extracting at least one data element (e.g., metadata element 220A, payload data element 230A) from request message 11A; and routing or directing the request message to a relevant approver node 30 via approver subnet 15B. In another example, system 20' may be configured to monitor transactions 100 by receiving an acknowledgement message 31 from the relevant approver node; extracting at least one data element (e.g., metadata element 220A, payload data element 230A) from acknowledgement message 31; and routing or directing acknowledgement message 31 to the relevant monitored requestor node 10, via requestor subnet 15A.

According to some embodiments of the invention, system 20' may include a pattern generator module 240, adapted to analyze the monitored transactions so as to obtain a transaction pattern 240A, as elaborated herein. Transaction pattern 240A may include at least one data element pertaining to monitored transactions 100, such as data elements 220A, 230A obtained or extracted from monitored transactions 100.

Transaction pattern 240A may include, for example, data pertaining to an identification, such as an address, a name, an identifying number, etc. of a specific, examined requestor node 10, and/or data pertaining to an identification of an approver node 30.

Additionally, or alternatively, pattern 240A may include data pertaining to a category of the examined requestor node (e.g., a computing device associated with a legal entity, such as a merchant, a computing device associated with a physical device, such as an Internet of Things (IoT) device, and the like).

Additionally, or alternatively, pattern 240A may include data pertaining to message metadata 220A, including for example, a frequency of transactions or messages (e.g., between an examined requestor node 10 and one or more approver nodes 30), timing of transactions or messages (e.g., between the examined requestor node and one or more approver nodes), and the like.

Additionally, or alternatively, pattern 240A may include data pertaining to message payload 230A, such as a category of a message payload and/or values of specific parameters of the message payload 230A. For example, in the aforementioned example of a transaction 100 involving purchase of goods via a paying card, between a requestor node that corresponds to a merchant's computer and an approver node that corresponds to an acquirer's server, pattern 240A may include the category of payload 230A (e.g., payload corresponding to a transfer of funds), and specific values included in payload data 230A, such as an indication of success or failure of the purchase, a category of purchased goods, a monetary sum that corresponds to the purchase, a currency that corresponds to the purchase and the like.

According to some embodiments of the invention, pattern generator 240 may include a NN module adapted to implement an ML-based model 241. Pattern generator 240 may analyze the monitored transactions 100 (e.g., analyze data elements 220A, 230A) by applying (or inferring, as referred to in the art) ML-model 241 on incoming transaction 100 data (e.g., 220A, 230A), thus obtaining said pattern 240A.

As depicted in FIG. 4A, during a training stage, ML-based model 241 may be trained as an unsupervised clustering model, as known in the art, to group or cluster transactions 100 according to the input transaction 100 data (e.g., 220A, 230A), e.g. to produce patterns. The subsequent groups or clusters may each manifest a pattern 240A of similar transactions 100.

It may be appreciated by a person skilled in the art that system 20' may obtain pattern 240A from incoming transactions 100 data (e.g., 220A, 230A) in a plurality of ways, such as by the non-limiting example of ML model 241, as described herein. Additional manners of obtaining pattern 240A may also be used.

According to some embodiments of the invention, monitoring module 220 and sniffer module 230 may continuously (e.g., over a predefined period of time) probe communication between an examined, or specific requestor node (e.g., element 10A of FIG. 2) and at least one specific approver node (e.g., element 30A of FIG. 2). System 20' may include an analysis module 260, adapted to analyze the probed communication, in view of one or more transaction patterns 240A, to identify a suspected transaction anomaly, and produce a respective indication of a suspected anomaly 260A.

The terms "suspected anomaly" and "suspected anomaly indication" may herein be used interchangeably, and may both be enumerated as element 260A in the corresponding drawings.

Pertaining to the example of a payment card purchase, as elaborated herein, a transaction pattern 240A may include an association between an identification of a specific requestor node 10A (e.g., a merchant's computing device), an identification of a specific approver node 30A (e.g., an acquirer's computing device), and a frequency (e.g., number of incidents per day) at which such transactions are carried out. Monitoring module 220 and sniffer module 230 may probe communication between requestor node 10A and approver node 30A, and analysis module may analyze the probed communication, in view of transaction patterns 240A, to identify a condition of a suspected anomaly 260A. In this example, anomaly 260A may be, for example, an indication that the number or frequency of said transactions (e.g., between 10A and 30A) falls short of the frequency expected by pattern 240A.

It may be appreciated that embodiments of the invention may be configured to identify a wide variety of anomalies 260A. For example, analysis module 260 may identify different types of anomalies 260A, corresponding to different stages (e.g., stages S100 through S155 of FIG. 3) of transaction 100, as elaborated herein.

According to some embodiments of the invention, and as depicted in FIG. 4B, during an inference stage of system 20', analysis module 260 may produce one or more suggestions for active probing 260B of one or more elements (e.g., computing devices or nodes) of split network 15 (e.g., as shown by the arrow from 260B to 210). The suggestions for active probing 260B may be adapted so as to further analyze or identify an anomaly 260A in split network 15. The term "active probing" may be used herein to refer to performance of an action on one or more elements of split network 15, and analyzing the response to that action. For example, in some embodiments of the invention, a suggestion for active probing 260B may include sending a data message (e.g., elements 11, 31, 41 of FIG. 2) to one or more nodes of split network 15 (e.g., to elements 10, 30 and 40 of FIG. 2, via subnets 15A and/or 15B), and analyzing the response (e.g., from nodes of split network 15) to that message, as elaborated in the examples that follow.

Additionally, or alternatively, and as depicted in FIG. 4B, during an inference stage of system 20', analysis module 260 may produce one or more suggestions for a corrective actions (marked "260C C.A. suggestion"). For example, in some embodiments of the invention, a suggestion for a corrective action 260C may include sending a data message to one or more nodes of split network 15 (e.g., to elements 10, 30 and 40 of FIG. 2, via subnets 15A and/or 15B), adapted to configure the recipient one or more nodes so as to overcome the suspected anomaly 260A, as elaborated in the examples that follow.

Figure 4C:
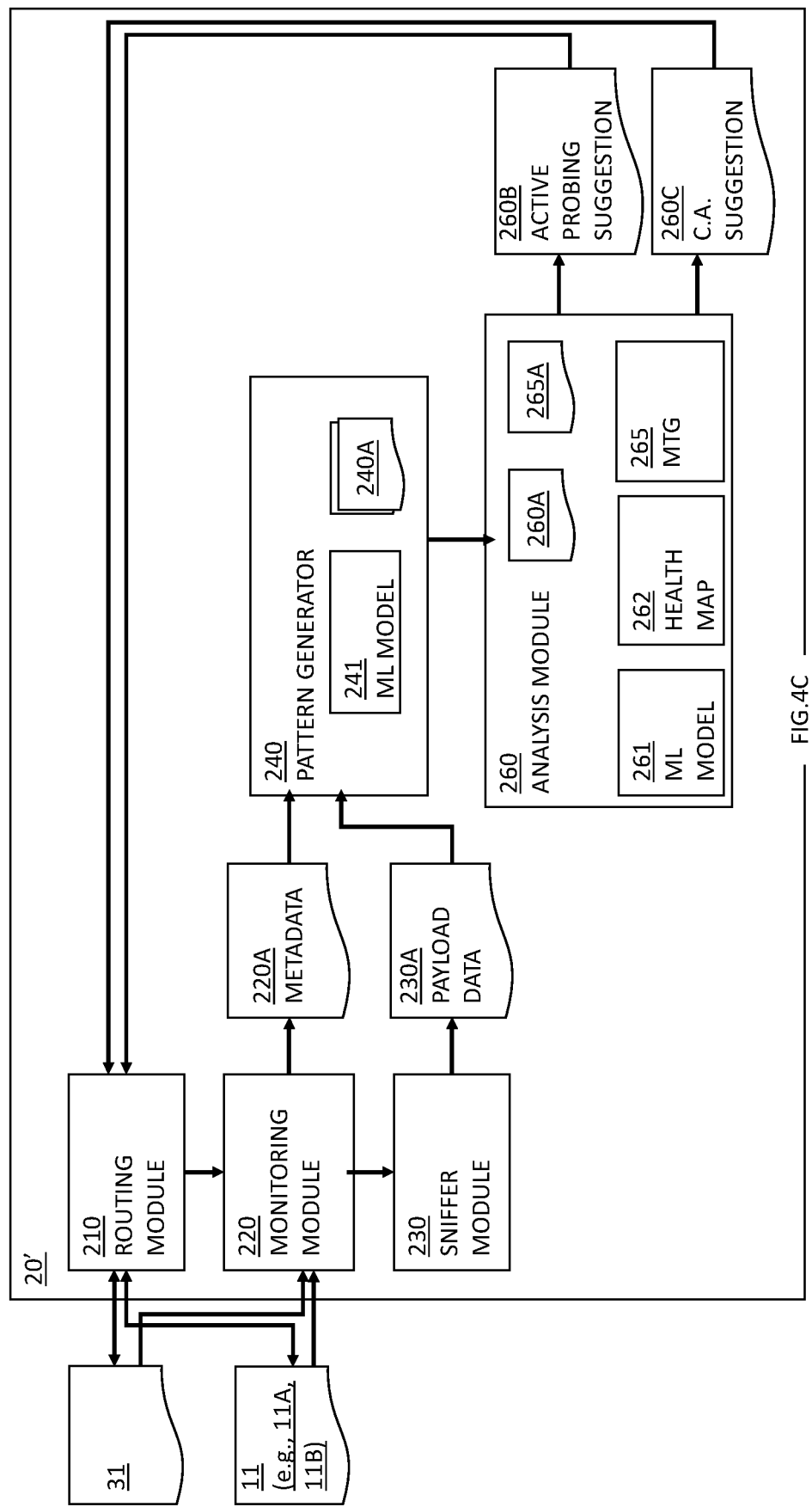
FIG. 4C is a block diagram, depicting another example of a system for analyzing and/or correcting an anomaly in a split computer network, during an inference stage, according to some embodiments of the present invention.

Reference is now made to FIG. 4C which is a block diagram, depicting another example of a system for analyzing and/or correcting an anomaly in a split computer network, during an inference stage, according to some embodiments of the present invention.

As shown in FIG. 4C, system 20' may include a message template generator (MTG) module 265. According to some embodiments MTG 265 may be included in analysis module 260 (as depicted in FIG. 4C). Alternatively, MTG 265 may be associated with (e.g., communicatively connected to) analysis module 260.

According to some embodiments of the invention, MTG 265 may be adapted to produce an expected message template 265A, based on transaction pattern 240A. Analysis module 260 may subsequently identify a suspected transaction anomaly 260A as a condition, in which the probed communication is different from, or is lacking a transaction 100 or message (e.g., 31, 11) that corresponds to the expected message template 265A. The term "expected" may be used herein in a sense that embodiments of system 20' may be adapted to predict the occurrence of, or properties of transactions 100.

For example, a pattern 240A may include, or may be defined by, a cluster of transactions 100 between a requestor node (e.g., 10A, such as a merchant's computing device) and an approver node (e.g., 30A, such as an acquirer's computing device or server). In this example, pattern 240A may include, for example, an identification (e.g., an address) of requestor node 10A, an identification of approver node 30A, a category or type of transactions (e.g., clearance of credit card payments), transaction payload data 230A (e.g., a value of payments for each transaction, an approval or denial of credit clearance by approver node 30A, and the like) and a time of occurrence of said transactions. A subsequent expected message template 265A may be, or may include, a generalization of pattern 240A. For example expected message template 265A may include elements of pattern 240A (e.g., identifications of requestor node 10A and approver node 30A), as well as a mean value (such as S70) for credit card payments, a ratio of approval (e.g., 95%) of credit card payment clearance by approver 30A, and a frequency (e.g., a mean value of 90 times each day) of transactions 100 between requestor node 10A and approver node 30A.

In other words, pertaining to this example, the information of expected message template 265A may include an expectation to observe a mean value of 90 credit card related transactions 100 each day, having a mean payment value of S70, passing between node 10A and node 30A, via intermediary node 20 (e.g., 20A, where system 20' is installed). Analysis module 260 may identify a suspected transaction anomaly 260A as a condition, in which the probed communication between nodes 10A and 30A does not (or no longer) fit the information of expected message template 265A. This may include, for example, a condition in which the number (e.g., 90) of daily transactions 100 has dropped (e.g., to 30), a condition in which communication of transactions 100 between nodes 10A and 30A via intermediary node 20A has stopped altogether, a condition in which the payload data (e.g., the mean price, the mean acceptance ratio, and the like) has changed substantially (e.g., dropped beyond a predefined threshold), etc.

Reference is now made back to FIG. 2. It is also assumed, in the context of the following discussion that system 20' may be included in, or hosted by intermediary node 20A, and may not reside in intermediary nodes 20B and 20C.

According to some embodiments, and as elaborated herein, system 20' may be configured to identify an anomaly or malfunction in communication of transactions 100 in one or more portions or legs across network 15, and suggest a corresponding corrective action.

For example, system 20' may identify an anomaly in the communication of transactions 100 in: (a) a first leg, extending from a requestor node 10 (e.g., 10A) to an intermediary node 20 (e.g., steps S105, S110 of FIG. 3); (b) a second leg, extending from intermediary node 20 to an approver node 30 (e.g., 30A) and back to intermediary node 20 (e.g., steps S115, S120, S125 and S130 of FIG. 3); and (c) a third leg, extending from intermediary node 20 back to the relevant requestor node 10 (e.g., 10B).

For each leg of the first, second and third legs, analysis module 260 may produce a respective indication of a suspected anomaly 260A, may produce a probing suggestion 260B, may refine or amend the suspected anomaly 260A based on outcome of probing suggestion 260B, and may produce a suggestion for a corrective action 260C, as elaborated in the examples that follow.

The following section will relate to identification, analysis and/or application of a corrective action of anomalies pertaining to the first leg (e.g., steps S105, S110 of FIG. 3).

As elaborated herein, system 20' may be adapted to perform at least one action of active probing, based on the suspected anomaly. For example, expected message template 265A may be or may include an expectation to receive a transaction request message 11A, as elaborated herein (e.g., in relation to FIG. 3, step S105). Analysis module 260 may recognize (e.g., based on data elements 220A, 230A) a condition in which such expected message has not been received (e.g., within the passing day). In other words, based on said one or more transaction patterns 240A, analysis module 260 may be adapted to identify a condition in which a transaction message is missing, in a sense that it has unexpectedly not been sent from a first node (e.g., requestor node 10) to a second node (e.g., approver node 30).

Accordingly, an initial suspected transaction anomaly 260A may include an indication that transaction request messages 11A have seized from being received from the examined requestor node 10B. Pertaining to the example of requestor node 10B belonging to a merchant's computing device, it may be appreciated that this condition may be caused by a plurality of causes. For example, this condition may be caused by: (a) a technical problem of node 10A and/or subnet 15A (e.g., node 10A not being able to produce or transfer transaction request message 11A via subnet 15A-1 to intermediary node 20A), (b) a change in configuration of requestor node 10B, as elaborated herein, and (c) a change in a preference of requestor node 10B, so as to collaborate with a different intermediary node (e.g., 20B, belonging to a competitor), instead of the first intermediary node 20A (hosting system 20').

Analysis module 260 may collaborate with MTG 265 to produce an active probing suggestion 260B, adapted to prompt the examined requestor node 10B, to initiate a request message 11A corresponding to the template. In other words, analysis module 260 may send a prompt message to requestor node 10B so as to prompt requestor node 10B to send at least one second transaction message corresponding to, or similar to the missing transaction message. The second transaction message may be referred to as "similar to" the missing transaction message in a sense that it may be of the same type (e.g., a transaction request message) may including similar payload data elements 230A and/or may include similar elements of metadata 220A as the missing transaction message.

For example, analysis module 260 may act as an initiator 40, as elaborated herein (e.g., in relation to FIG. 3, steps S100, S100') and produce a prompt message (e.g., element 41A of FIG. 2), to prompt examined requestor node 10B to emit a transaction request message (e.g., element 11A of FIG. 2), directed to an appropriate approver node 30. In other words, pertaining to the example of a requestor node that is a merchant's computing device, analysis module 260 may disguise intermediary node 20A, and act as a computing device 40 of an initiator (e.g., a purchasing client), to initiate a credit card related transaction.

Analysis module 260 may analyze communication over split network 15, subsequent to active probing suggestion 260B, to further identify, or refine the identification of the suspected transaction anomaly 260A.

Pertaining to the same example, analysis module 260 may identify a condition in which examined requestor node 10B has successfully received probing suggestion 260B (which is, in this condition, a prompt message 41). For example, analysis module 260 may identify reception, by system 20' (e.g., in its "disguise" as an initiator node 40), of at least one acknowledgement message, such as message S100' (before fruition or completion of transaction 100) or S155 (e.g., after fruition or completion of transaction 100). Analysis module 260 may further identify a condition in which, in spite of having successfully received prompt message 41 (e.g., as probing suggestion 260B), the examined requestor node 10B did not send the prompted request message 11A via requestor subnet 15A-1 to intermediary node 20A (e.g., within a predefined period of time). In this condition, analysis module 260 may determine that the cause for lack of a request message was a change in a configuration of requestor node 10B. For example, requestor node 10B may have been configured to prefer or to collaborate with a different intermediary node, such as 20B (which may be logically disconnected from intermediary node 20A) for communicating with approver node 20A. In addition, requestor node 10B may have also been communicating with intermediary node 20B via another requestor subnet, such as 15A-2 or 15A-3, to which intermediary node 20A (hosting system 20') may not have access. Subsequent to such identification, analysis module 260 may refine the indication of suspected anomaly 260A, to include an indication that the probable cause for not having received transaction request messages 11A (e.g., step S105 of FIG. 3) as expected by pattern 240A was the change in the configuration of requestor node 10B (e.g., a configuration or preference to communicate via an intermediary node other than 20A).

It may thus be appreciated that embodiments of the invention may provide an improvement over currently available systems for analyzing network communication by not only identifying anomalies in messages that are received by system 20', but also by identifying expected transactions 100 and/or messages that were not received by system 20'.

According to some embodiments, analysis module 260 may produce a suggestion for corrective action 260C based on the suspected anomaly 260A. Pertaining to the same example, if analysis module 260 has concluded that a probable cause (e.g., suspected anomaly 260A) for not having received transaction request messages 11A (e.g., step S105 of FIG. 3) as expected by pattern 240A was the change in the configuration of requestor node 10B (e.g., so as to prefer a an intermediary node other than 20A), then suggestion for corrective action 260C may include, for example, a notification (e.g., via output device 8 of FIG. 1) prompting the attention of an appropriate user (e.g., a sales person).

Alternatively, analysis module 260 may identify a condition in which payload data 230A of an incoming message from examined requestor node 10B, in response to prompt message 41, does not match the expected payload, as included in pattern 240A. For example, requestor node 10B may produce a request message 11A (e.g., S105 of FIG. 3) in response to prompt message 41 (e.g., suggested probing message 260B). As elaborated herein (e.g., in relation to FIG. 4A) pattern 240A may include at least one data element pertaining to expected information that may be included in a payload of request message 11A. As elaborated herein, sniffer module 230 may receive prompted request message 11A and extract at least one data element 230A from the prompted transaction request payload. Analysis module 260 may identify at least one discrepancy between the extracted data element 230A and data included in transaction pattern 240A, to identify an anomaly in transaction 100. It may be appreciated that many such discrepancies may be identified, and that analysis module 260 may produce a respective suggestion for a corrective action 260C, based on the appropriate context. Pertaining to the example in which requestor node 10B is a computing device (e.g., element 1 of FIG. 1) belonging to a merchant, if pattern 240A includes at least one data element representing an expected acceptance of the purchase, and extracted data element 230A includes at least one data element representing refusal of the purchase, then analysis module 260 may conclude that the cause for lack of a request message was probably a change in a configuration of the examined requestor node 10B, that may, for example led to rejection of an prompt message 41 that was expected to be accepted.

Analysis module 260 may refine the indication of suspected anomaly 260A, to include this conclusion. In other words, suspected anomaly 260A may include an indication that a configuration of the examined requestor node has produced an unexpected message payload. For example, if requestor node 10 was initially configured to accept transactions from a specific country, and then a configuration of a requestor node 10 (e.g., a computing device 1 associated with a merchant) was changed so as not to accept transactions originating from the specific country, then analysis module 260 may analyze payload data 230A (including for example an identification of a country of origin) in view of pattern 240A (e.g., including countries for which transaction 100 may be accepted). Analysis module 260 may then refine the indication of suspected anomaly 260A, to include a cause (e.g., a change in a configuration relating to said country) for the rejection of transaction 100.

Alternatively, analysis module 260 may identify a condition in which the examined requestor node 10B has not received probing suggestion 260B (e.g., disguised as prompt message 41), or at least has not responded with an appropriate acknowledgement message such as message S100' (before fruition or completion of transaction 100) or S155 (after fruition or completion of transaction 100). In this condition, analysis module 260 may determine that the cause for lack of a request message 11A (e.g., S105 of FIG. 3) was either: (a) a failure in the examined requestor node 10B (e.g., a malfunction in a computing device of a merchant's requestor node 10B); or (b) a failure (e.g., a technical failure) in requestor subnet 15A.

Analysis module 260 may subsequently repeat communication of probing suggestion 260B (e.g., prompt message 41) to examined requestor node 10B several times, and may collaborate with routing module 210 so as to route message 41 via a plurality of paths (e.g., combinations of computing nodes) within subnet 15A.

If at least one of acknowledgement message S100', request message S105 and/or acknowledgement message S155 is subsequently (e.g., within a predefined period of time) received, then analysis module 260 may conclude that the cause for lack of a request message was probably a failure in communication over subnet 15A, and may refine the indication of suspected anomaly 260A, to include this conclusion. Analysis module 260 may also produce a suggestion for corrective action 260C to routing module 210 so as to use a routing path that corresponds to the successfully communicated prompt message 41. Additionally, or alternatively, corrective action suggestion 260C may include a message, addressed for one or more requestor nodes 10, notifying them of the failure of communication in subnet 15A. Additionally, or alternatively 260C may include a communication to a network diagnostic tool, such as a third-party network diagnostic tool as known in the art, that may be adapted to identify one or more nodes of subnet 15A that may malfunctioning, and may be adapted to enforce routing of messages between requestor nodes 10A and intermediary node 20A via functional nodes of subnet 15A.

Alternatively, if none of acknowledgement message S100', request message S105 and acknowledgement message S155 are subsequently (e.g., within a predefined period of time) received, then analysis module 260 may conclude that the cause for lack of a request message was a failure in a computing device associated with the examined requestor node 10A, that a webpage pertaining to examined requestor 10A has failed (e.g., is inactive or non-responsive) and the like. Analysis module 260 may refine the indication of suspected anomaly 260A, to include this conclusion.

Analysis module 260 may also produce a suggestion for corrective action 260C based on suspected anomaly 260A. For example, producing suggestion 260C may include, transmitting a message to a user (e.g., via display on output device 8 of FIG. 1) or to routing module 210, notifying that requestor node 10B is experiencing technical issues. Additionally, or alternatively, suggestion 260C may include a notification to one or more users and/or computing devices associated with failed requestor node 10A, via any appropriate communication. For example, suggestion 260C may include a message (e.g. an email message) that may be sent to an account of a contact person (e.g., an administrator), associated with failed requestor node 10A.

The following section will relate to identification, analysis 260A and/or application of a corrective action 260C of anomalies pertaining to the second leg, extending from intermediary node 20 to an approver node 30 (e.g., 30A) and back to intermediary node 20 (e.g., steps S115, S120, S125 and S130 of FIG. 3).

According to some embodiments, analysis module 260 may recognize a condition in which request message 11A has been forwarded from intermediary node 20A to approver node 30 (e.g., 30A), via subnet 15B (e.g., step S115 of FIG. 3), but the expected response message (e.g., step S130 of FIG. 3) has not been received (e.g., within a predefined period of time or not received altogether). It may be appreciated that system 20' may fail to response message S130 due to a failure in one or more nodes (or connections therebetween) of subnet 15B and/or due to a problem in the relevant approver node 30.

According to some embodiments of the invention, analysis module 260 may include a health map 262, adapted to collaborate with routing module 210, so as to obtain information pertaining to timewise performance of one or more nodes in subnet 15B.

For example, health map 262 may be, or may include a data structure (e.g., a table), that may maintain a list of nodes (e.g., computing device 1 of FIG. 1), included in subnet 15B. In other words, health map 262 may maintain data pertaining to roundtrip travel of the transaction between intermediary node 20 (hosting system 20') and approver node 30 (e.g., steps S115, S120, S125 and S130 of FIG. 3) via nodes of subnet 15B.

According to some embodiments of the invention, in an event that a transactions has been routed via one or more nodes of subnet 15B, and has failed to return to intermediary node 20A (e.g., step 130) within a predefined period of time, analysis module 260 may produce an initial indication of suspected anomaly 260A, including a notification of said failure.

According to some embodiments, as information regarding traversal of messages is accumulated in health map 262 over time, analysis module 260 may utilize the accumulated data to refine indication of suspected anomaly 260A, to include specific one or more nodes that may be suspected to having poor connectivity timewise performance (e.g., beyond a predefined threshold of latency). Additionally, or alternatively, analysis module 260 may collaborate with routing module 210 to transmit at least one probing suggestion 260B that is a message for at least one suspected node of subnet 15B, to actively ascertain responsivity and/or timewise performance of said node.

Additionally, or alternatively, analysis module 260 may produce at least one suggestion for a corrective action 260C, that may for example be a message or a command to routing module 210, to route messages between requestor node 10 and approver nodes 30 via functional nodes of network 15, according to data accumulated in health map 262. For example, corrective action 260C may include a determined routing path, along which routing module 210 may route messages to at least one node approver 30 (e.g., to reroute messages S115 through S130 so as to bypass a problematic node). Additionally, corrective action 260C may include a determined routing path that may include a portion of the round trip that has previously been determined as problematic, so as to determine whether the problem persists (e.g., using transactions that are not time sensitive). Additionally, corrective action 260C may include a notification or alert to one or more users, such as users of nodes 10, 20 and/or 30 (e.g., via output device 8 of FIG. 1), to notify the users of the computer network 15 connectivity problem.

As elaborated above, a problem in a roundtrip of transaction 100 from intermediary node 20 to approver node 30 and back to intermediary node 20 (e.g., steps S115 through S130 of FIG. 3), such as a roundtrip travel time that exceeds a predefined threshold, may stem from a problem in approver node 30.

For example, a failure of approver node 30 (e.g., approver node 30 being turned off or disconnected from subnet 15B) may result in complete failure of all transactions 100 to meet a predefined limit of roundtrip delay. According to some embodiments of the invention, analysis module 260 may identify a condition in which such a complete failure of all transactions 100 occurs, and may subsequently produce an initial indication of suspected anomaly 260A, including a notification of said failure.

In another example, a specific configuration of approver node 30 may result in partial failure of transactions to meet this limit. For example, in a condition that approver node 30 may require, for a subset or portion of the transactions, additional computations and/or communication with one or more additional nodes (e.g., within or beyond subnet 15B), a respective subset of transactions 100 may fail to meet the predefined limit of roundtrip delay. According to some embodiments of the invention, analysis module 260 may identify a condition in which such a portion of all transactions 100 occurs, and may subsequently produce an initial indication of suspected anomaly 260A, including a notification of said failure.

According to some embodiments of the invention, analysis module 260 may include a NN module adapted to implement an ML-based model 261. Said ML-based model 261 may be or may include for example be an unsupervised clustering model. ML-based model 261 may be adapted to receive one or more data elements including for example, metadata 220A of transactions 100, payload data 230A of transactions 100 and/or roundtrip delay of transactions 100. ML-based model 261 may be configured to cluster transactions 100 based on said received respective data, so as to produce a plurality of clusters, as known in the art, pertaining to properties of the clustered transactions 100.

For example, as elaborated herein, transaction 100 may pertain to clearance of a paying card (e.g., credit card, a debit card) purchase of goods, where requestor 10 may be a computing device of a merchant and approver node 30 may be a computing device belonging to an acquirer (e.g., a banking server). In this condition, payload data 230A of transactions 100 may include, for example: a geolocation of requestor 10 and or of initiator 40; a category of said purchased goods or a sector of industry corresponding to the purchased goods; a currency used in the purchase; a type of commercial transaction (e.g., a debit transaction, a credit transaction, a transaction of multiple installments, etc.); presence or absence (e.g., when using an electronic wallet, as known in the art) of a physical paying card in the transaction; a type or brand of the used paying card type; an amount of money included in the purchase; and a level of risk associated with one or more elements of the purchase (e.g., based on a credit history of the initiator 40, a history of chargebacks associated with the merchant, and the like).

According to some embodiments of the invention, analysis module 260 may produce an initial indication of suspected anomaly 260A, including a notification of failure of transactions 100, and one or more properties associated with said failures. Pertaining to the above example, the initial indication of suspected anomaly 260A may include an indication of a geolocation, such as a country C1 of one or more merchants, that may be associated with a high rate of transaction failures (e.g., failure to meet a predefined roundtrip time limit).

According to some embodiments of the invention, analysis module 260 may produce one or more probing suggestion 260B that may be or may include a message such as a transaction request (e.g., S115 of FIG. 3) addressing at least one approver node 30. Said probing suggestion 260B may include additional metadata 220A and/or payload data 230A, and may be used by ML model 261 to improve, or "fine tune" the clustering of transactions 100. Analysis module 260 may subsequently produce a refined indication of suspected anomaly 260A, that may include data that is more specific, or more definitive to problematic transactions 100. Pertaining to the example above, refined indication of suspected anomaly 260A may include a plurality of properties of transactions that may be associated with a high rate of transaction failures. This may include, for example, a combination of a country C1 of one or more merchants, a country of one or more customers (e.g., users of initiator node 40), and a category of purchased goods.

According to some embodiments of the invention, analysis module 260 may produce one or more suggestions for corrective actions 260C, based on the indication of suspected anomaly 260A. For example, the one or more suggestions for corrective actions 260C may include a suggestion to route one or more specific transactions 100 to at least one specific approver node 30, and analysis module 260 may collaborate with routing module 210 so as to route the one or more specific transactions 100 to the at least one specific approver node 30. In another example, the one or more suggestions for corrective actions 260C may include a notification or alert to one or more users, such as users of nodes 10, 20 and/or 30 (e.g., via output device 8 of FIG. 1), to notify the users of the problem.

Additionally, or alternatively, and pertaining to the same example, the one or more suggestions for corrective actions 260C may include a suggestion for at least one requestor node 10 (or a user thereof) to negotiate with an initiator node 40, so as to change one or more elements of metadata 220A and/or payload data 230A of transaction 100. Such a change may include, for example, targeting a different approver node 30, using a different paying card, and the like.

The following section will relate to identification, analysis and/or application of a corrective action 260C of anomalies pertaining to the third leg, extending from intermediary node 20 (e.g., intermediary node 20A, hosting system 20') to requestor node 10 (e.g., 10B) as elaborated by steps S135-S150 of FIG. 3. According to some embodiments of the invention, analysis module 260 may be configured to identify a suspected anomaly 260A by which acknowledgement message 31 (e.g., steps S135, S140 of FIG. 3) has not reached requestor node 10B, and may produce at least one suggestion for a corrective action 260C to overcome suspected anomaly 260A.

Reference is made back to the example in which requestor node 10 is a computing device 1 belonging to a merchant, and approver node 30 is a computing device 1 belonging to an acquirer or a bank. In this example, a problem in subnet 15A (e.g., 15A-1) and/or requestor node 10B may cause requestor node 10B not to receive acknowledgement message 31. Subsequently, requestor node 10B (e.g., a merchant's computing device) may consider transaction 100 to be timed-out, and may send one or more messages 11B (e.g., steps S145 and S150) that may include cancellation of the transaction. As known in the art, a merchant's computing device may send messages 11B of cancellation a plurality of times, to minimize the risk of not reaching the acquirer node. Intermediary node 20 (e.g., 20A) may receive the one or more messages 11B of cancellation, as it had, at this stage, received transaction request 11A. Accordingly, analysis module 260 may produce an indication of a suspected anomaly 260A that may include an indication of a connectivity problem in subnet 15A.

According to some embodiments, analysis module 260 may produce one or more probing suggestions 260B, that may include communication of messages to the relevant monitored requestor node 10B, and may collaborate with routing module 210, to route the messages one or more probing suggestions 260B via a plurality of routing paths and thus refine suspected anomaly 260A, to identify one or more problematic communication nodes in subnet 15A.

According to some embodiments, analysis module 260 may produce at least one suggestion for a corrective action 260C to overcome suspected anomaly 260A. For example, as elaborated herein (e.g., in relation to subnet 15B), analysis module 260 may maintain, within health map 262, a list of functional communication nodes in subnet 15A. According to some embodiments, analysis module 260 produce a corrective action 260C that may include a preferred route or path including the functional communication nodes, and may collaborate with routing module 210, to route messages of transaction 100 to requestor node 10B via the functional communication nodes. Additionally, or alternatively, suggestion of a corrective action 260C may include a sending a message 31 to one or more requestor nodes 10, that may include a notification of one or more malfunctioning nodes of subnet 15A, so that requestor nodes 10 may avoid communication via the malfunctioned nodes.

As elaborated herein, requestor node 10B (e.g., a merchant's computing device 1) may send a message 11B such as a confirmation message (e.g., steps S145, S150 of FIG. 3), so as to confirm reception of acknowledgement message 31, via one or more nodes of requestor subnet 15A to intermediary node 20. According to some embodiments, analysis module 260 may be configured to identify a suspected anomaly 260A by which confirmation message 11B has not been received, and produce at least one suggestion of a corrective action 260C to overcome suspected anomaly 260A. It may be appreciated that such a condition may originate from: (a) a problem in subnet 15A and/or (b) a problem in requestor node 10B (e.g., a computer malfunction, a merchant's website malfunction, etc.). The analysis and handling of (a) was elaborated above, and will not be repeated herein for the purpose of brevity.

According to some embodiments, analysis module 260 may produce one or more probing suggestions 260B, that may include sending one or more messages 31 to requestor node 10B, via a communication network beyond subnet 15A (e.g., beyond subnet 15A-1). For example, probing suggestion 260B may include sending, by intermediary node 20A at least one message 31 to a requestor node 10B (e.g., a web server, that may host a website of a merchant) via a communication network (e.g., via a cellular data network, via subnet 15A-2) that may not be included in subnet 15A-1. Analysis module 260 may, or may not receive a response to messages 31 from requestor node 10B, and may ascertain (e.g., based on reception of a response, or lack thereof) a condition of requestor node 10B: In a condition that analysis module 260 has not received a response to messages 31, analysis module 260 may refine suspected anomaly 260A, to indicate that requestor 10B (e.g., a website associated with requestor 10B) may be non-responsive. In a condition that analysis module 260 did receive a response to messages 31, analysis module 260 may refine suspected anomaly 260A, to indicate that a probable cause for not receiving confirmation message 11B is a malfunction in subnetwork 15A (e.g., 15A-1).

Figure 5:
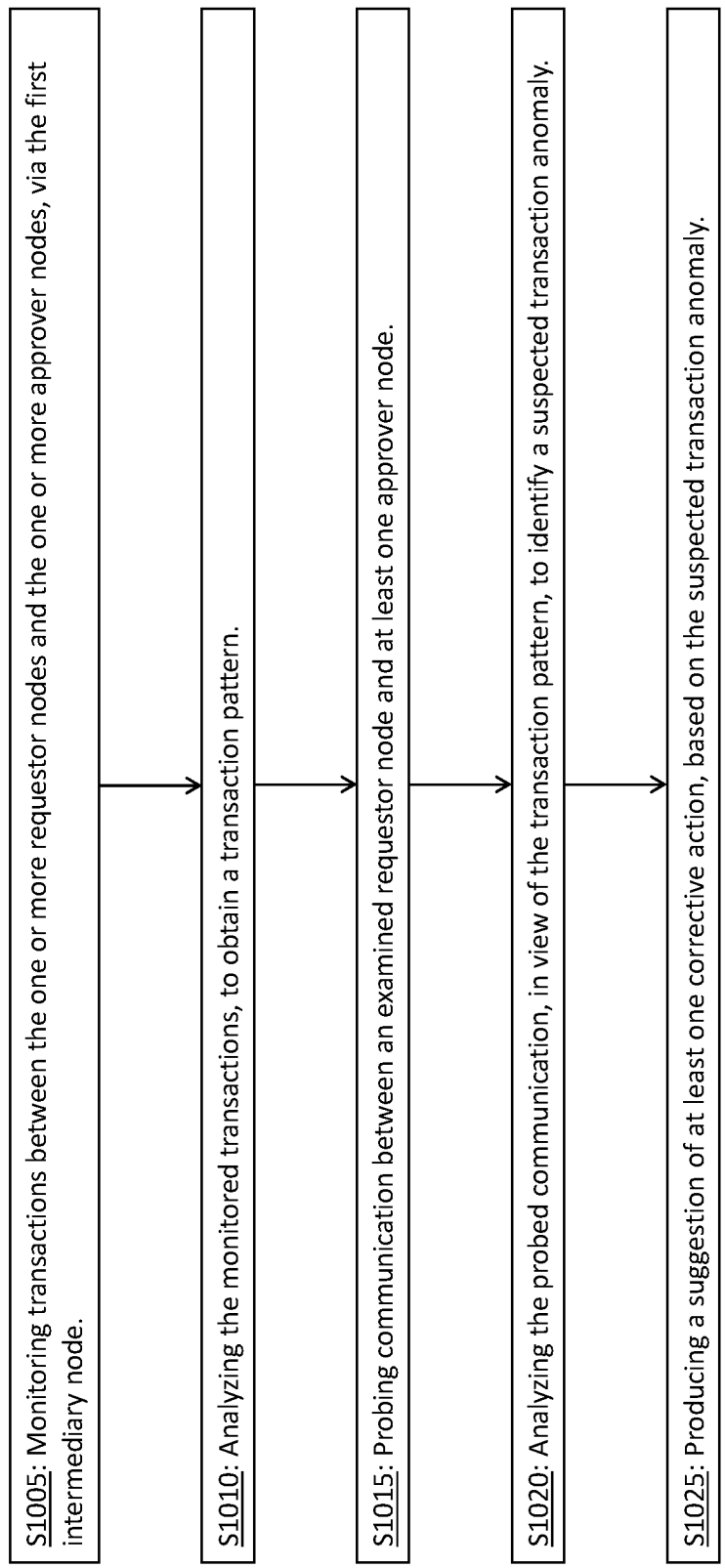
FIG. 5 is a flow diagram, depicting an example of a method of analyzing and/or correcting an anomaly in a split computer network, according to some embodiments of the present invention.

Reference is now made to FIG. 5, which is a flow diagram, depicting an example of a method of analyzing and/or correcting an anomaly in a split computer network (e.g., element 15 of FIG. 2), according to some embodiments of the present invention.

As shown in step S1005, at least one processor (e.g., element 2 of FIG. 1) associated with, or included in a first intermediary node (e.g., element 20A of FIG. 2) may be configured to monitor transactions, such as the example of transaction 100 of FIG. 3, between one or more requestor nodes (e.g., elements 10 of FIG. 2) and one or more approver nodes (e.g., elements 30 of FIG. 2) of split network 15, via the first intermediary node.

As shown in step S1010, the at least one processor 2 may analyze the monitored transactions 100, to obtain a transaction pattern (e.g., elements 240A of FIG. 4A), as elaborated herein (e.g., in relation to FIGS. 4A, 4B and 4C).

As shown in step S1015, the at least one processor 2 may probe communication between an examined requestor node (e.g., element 10B of FIG. 2) and at least one approver node 30.

As shown in step S1020, the at least one processor 2 may analyze the probed communication, in view of the transaction pattern 240A, to identify a suspected transaction anomaly (e.g., element 260A of FIG. 4B), as elaborated herein (e.g., in relation to FIGS. 4B and 4C).

As shown in step S1025, the at least one processor 2 may produce a suggestion of at least one corrective action (e.g., element 260C of FIG. 4B), based on the suspected transaction anomaly as elaborated herein (e.g., in relation to FIGS. 4B and 4C).

Embodiments of the invention include a practical application for actively monitoring communication of transactions in a split network, as elaborated herein.

Embodiments of the invention provide an improvement over technology of currently available methods and systems for management of network communication, in a unique network constellation, referred herein as a split network such as example split network 15. As elaborated herein, split network 15 includes a first subnet 15A and a second subnet 15B, where transactions are communicated between subnets 15A and 15B via one of a plurality of intermediary nodes. In addition, the plurality of intermediary nodes may be logically disconnected, in a sense that they may not communicate or share information pertaining to said transactions. Therefore system 20' may not be regarded as managing communication via network 15 (e.g., between requestor nodes 10 and approver nodes 30) in a traditional sense, as it may be restricted from obtaining some of the information required for such management.

Instead, by methods elaborated herein, system 20' may analyze communication of transactions via subnetwork 15, to produce one or more transaction patterns 240A of expected data (e.g., metadata and/or payload) of transactions, and analyze communication via subnetwork 15, according to the transaction patterns 240A of expected data. It may be appreciated, for example, that this approach may enable system 20' to not only monitor communication over network 15 based on analysis of messages that may have been transferred via system 20' but also based on analysis of messages that have not been transferred via system 20'.

Additionally, as elaborated herein, embodiments of the invention provide an improvement over technology of currently available methods and systems for management of network communication by applying specific probing actions 260B, relating to respective legs of communication via network 15, to refine analysis of suspected anomalies in network 15, and provide at least one respective suggestion for a corrective action 260C, to overcome the relevant suspected anomaly 260A.

Unless explicitly stated, the method embodiments described herein are not constrained to a particular order or sequence. Furthermore, all formulas described herein are intended as examples only and other or different formulas may be used. Additionally, some of the described method embodiments or elements thereof may occur or be performed at the same point in time.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

Various embodiments have been presented. Each of these embodiments may of course include features from other embodiments presented, and embodiments not specifically described may include various features described herein.

The invention claimed is:

1. A method of correcting an anomaly in a split computer network, the split computer network comprising: (a) a first subnet, connecting one or more requestor nodes to a first intermediary node and to one or more second intermediary nodes; and (b) a second subnet, connecting the first intermediary node and the one or more second intermediary nodes to one or more approver nodes, wherein the method comprises performing, by at least one processor of the first intermediary node:
   monitoring transactions between the one or more requestor nodes and the one or more approver nodes, via the first intermediary node;
   analyzing the monitored transactions, to obtain a transaction pattern;
   probing communication between an examined requestor node and at least one approver node;
   analyzing the probed communication, in view of the transaction pattern, to identify a suspected transaction anomaly in which the number or frequency of transactions falls short of the number or frequency expected by the transaction pattern; and
   producing a suggestion of at least one corrective action, based on the suspected transaction anomaly,
   wherein the transaction pattern comprises: an identification of the examined requestor node and one or more approver nodes, a number or frequency of expected transactions between these nodes, and a payload of these transactions, and wherein the one or more second intermediary nodes do not communicate, to the first intermediary node, information that pertains to transactions that are communicated via the split network.

2. The method of claim 1, wherein monitoring the transactions comprises at least one of:
   receiving a request message from a monitored requestor node;
   extracting at least one data element from the request message; and
   directing the request message to a relevant approver node.

3. The method of claim 2, wherein monitoring the transactions further comprises at least one of:
   receiving an acknowledgement message from the relevant approver node;
   extracting at least one data element from the acknowledgement message; and
   directing the acknowledgement message to the monitored requestor node.

4. The method of claim 1, wherein the transaction pattern further comprises at least one data element, selected from a list consisting of: a category of the examined requestor node, a category of a message payload, and a timing of messages between the examined requestor node and one or more approver nodes.

5. The method of claim 1, further comprising:
   producing an expected message template, based on the transaction pattern; and
   identifying a suspected transaction anomaly as a condition in which the probed communication lacks a message that corresponds to the template of the expected message.

6. The method of claim 5, wherein the template is of an expected request message, and wherein the method further comprises prompting, by the first intermediary node, the examined requestor node, to initiate a request message corresponding to the template.

7. The method of claim 6, wherein identifying a suspected transaction anomaly further comprises:
receiving, by the first intermediary node, the prompted request message;
extracting at least one data element from the prompted transaction request payload; and
identifying a discrepancy between the extracted data element and the transaction pattern.

8. The method of claim 7, wherein identifying a suspected transaction anomaly comprises determining, by the first intermediary node, that a prompted request message has not been received from the examined requestor node within a predefined time period.

9. The method of claim 5, further comprising producing at least one indication of a suspected transaction anomaly, selected from a list consisting of:
an indication that the number or frequency of transactions between the examined requestor node and one or more approver nodes falls short of a number expected by the one or more transaction patterns;
an indication that communication between the examined requestor node and one or more approver nodes does not fit the message template;
an indication that a configuration of the examined requestor node dictates preference of communication via a second intermediary node;
an indication that a configuration of the examined requestor node produces unexpected message payload;
an indication that a computing device pertaining to the examined requestor node has failed;
an indication that a webpage pertaining to the examined requestor node has failed;
an indication of one or more nodes that may be suspected of having poor connectivity performance;
an indication that a portion of communicated transactions that have failed; and
an indication of one or more properties of transactions that are associated with a high rate of transaction failure.

10. The method of claim 1, wherein the suggestion of at least one corrective action is selected from a list of suggestions, consisting of:
sending a message to an account of a contact person, associated with the examined requestor node, to notify them of a failure of the examined requestor node;
sending a command to a routing module, to route messages between the examined requestor node and one or more approver nodes via functional nodes of the split computer network;
notifying one or more users of requestor nodes, intermediary nodes and/or approver nodes regarding a computer network connectivity problem;
routing one or more specific transactions from the examined requestor node to at least one specific approver node; and
sending a suggestion to the examined requestor node to negotiate with an initiator node, to change one or more elements of metadata and/or payload data of a transaction.

11. A system for correcting an anomaly in a split computer network, the system comprising a first intermediary node, communicatively connected via a first subnet to one or more requestor nodes and communicatively connected via a second subnet to one or more approver nodes, the first intermediary node comprises a non-transitory memory device, where modules of instruction code are stored, and a processor associated with the memory device, and configured to execute the modules of instruction code, whereupon execution of said modules of instruction code, the processor is configured to:
monitor transactions between the one or more requestor nodes and the one or more approver nodes, via the first intermediary node;
analyze the monitored transactions, to obtain a transaction pattern;
probe communication between an examined requestor node and at least one approver node;
analyze the probed communication, in view of the transaction pattern, to identify a suspected transaction anomaly, in which the number or frequency of transactions falls short of the number or frequency expected by the transaction pattern; and
produce a suggestion of at least one corrective action, based on the suspected transaction anomaly
wherein the transaction pattern comprises: an identification of the examined requestor node and one or more approver nodes, a number or frequency of expected transactions between these nodes, and a payload of these transactions, and
wherein the split computer network further comprises one or more second intermediary nodes adapted to (a) route one or more transactions between the one or more requestor nodes and the one or more approver nodes, and (b) not communicate, to the first intermediary node, information that pertains to transactions communicated via the split network.

12. The system of claim 11, wherein the processor is configured to monitor the transactions by:
receiving a request message from a monitored requestor node;
extracting at least one data element from the request message; and
directing the request message to a relevant approver node.

13. The system of claim 12, wherein the processor is configured to further monitor the transactions by performing at least one of:
receiving an acknowledgement message from the relevant approver node;
extracting at least one data element from the acknowledgement message; and
directing the acknowledgement message to the monitored requestor node.

14. The system of claim 11, wherein the transaction pattern further comprises at least one data element, selected from a list consisting of: a category of the examined requestor node, a category of a message payload, and a timing of messages between the examined requestor node and one or more approver nodes.

15. The system of claim 11, wherein the processor is further configured to:
produce an expected message template, based on the transaction pattern; and
identify a suspected transaction anomaly as a condition in which the probed communication lacks a message that corresponds to the template of the expected message.

16. The system of claim 15, wherein the template is of an expected request message, and wherein the processor is further configured to prompt the examined requestor node, to initiate a request message corresponding to the template.

17. The system of claim 16, wherein the processor is configured to identify a suspected transaction anomaly by:
- receiving the prompted request message;
- extracting at least one data element from the prompted transaction request payload; and
- identifying a discrepancy between the extracted data element and the transaction pattern.

18. The system of claim 17, wherein the processor is further configured to identify a suspected transaction anomaly by determining that a prompted request message has not been received from the examined requestor node within a predefined time period.

19. The system of claim 15, wherein the processor is further configured to produce at least one indication of a suspected transaction anomaly, selected from a list consisting of:
- an indication that the number or frequency of transactions between the examined requestor node and one or more approver nodes short of a number expected by the one or more transaction patterns;
- an indication that communication between the examined requestor node and one or more approver nodes does not fit the message template;
- an indication that a configuration of the examined requestor node dictates preference of communication via a second intermediary node;
- an indication that a configuration of the examined requestor node produces unexpected message payload;
- an indication that a computing device pertaining to the examined requestor node has failed;
- an indication that a webpage pertaining to the examined requestor node has failed;
- an indication of one or more nodes that may be suspected of having poor connectivity performance;
- an indication that a portion of communicated transactions that have failed; and
- an indication of one or more properties of transactions that are associated with a high rate of transaction failure.

20. The system of claim 11, wherein the suggestion of at least one corrective action is selected from a list of suggestions, consisting of:
- sending a message to an account of a contact person, associated with the examined requestor node, to notify them of a failure of the examined requestor node;
- sending a command to a routing module to route messages between the examined requestor node and one or more approver nodes via functional nodes of the split computer network;
- notifying one or more users of requestor nodes, intermediary nodes and/or approver nodes regarding a computer network connectivity problem;
- routing one or more specific transactions from the examined requestor node to at least one specific approver node; and
- sending a suggestion to the examined requestor node to negotiate with an initiator node to change one or more elements of metadata and/or payload data of a transaction.

* * * * *